2,873,166
PROCESS FOR THE RECOVERY OF METAL VALUES

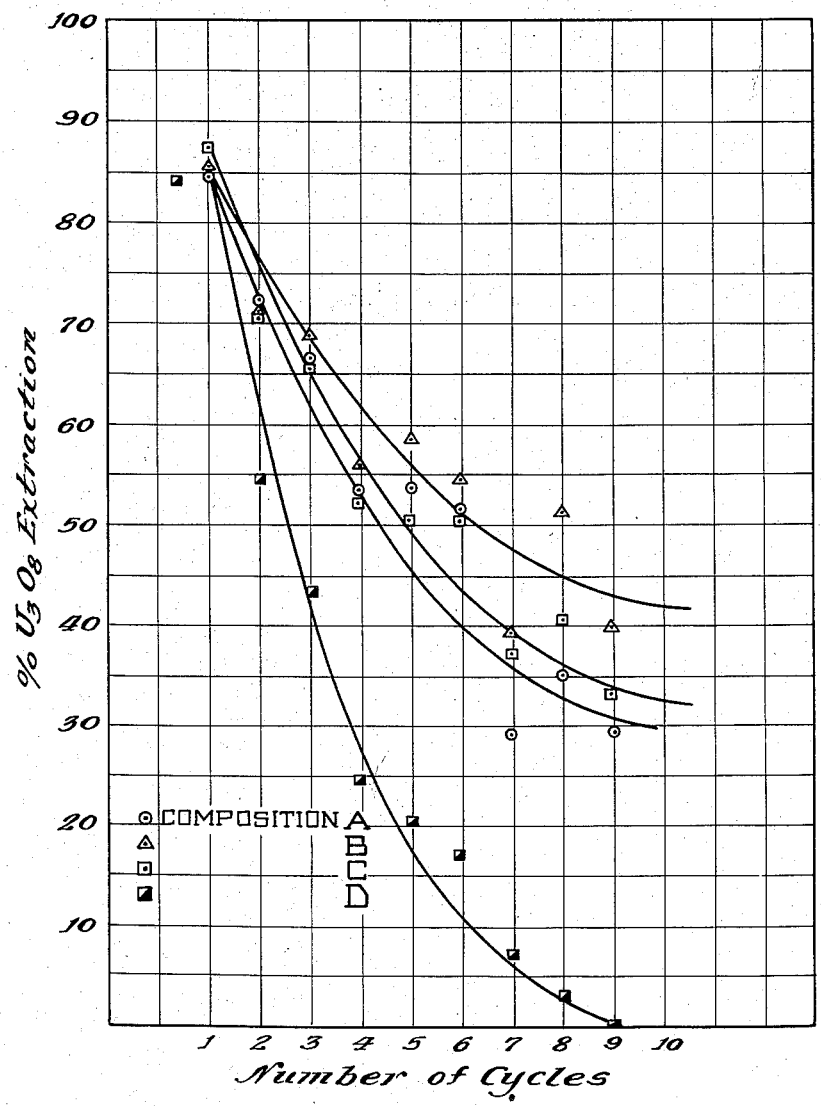

William R. Bowen, Lakeland, Fla., assignor, by mesne assignments, to the United States of America as represented by the United States Atomic Energy Commission Application July 7, 1953, Serial No. 366,605

14 Claims. (Cl. 23—14.5)

This process relates to the recovery of certain mineral values from phosphate ores such as the leached zone layer and phosphate matrix layer found in the Florida pebble phosphate fields and other uranium ores. The leached zone layer lies intermediately to the top sands cover and the phosphate matrix. The leached zone layer averages 6 to 11 feet in depth and may be found with a transition zone between it and the phosphate matrix comprising a mixture of materials from each of the matrices. The phosphate matrix found below the leached zone averages 10 to 20 feet in depth. Strip mining removes the sandy top cover. This uncovers the leached zone, or so-called Bartow clay, which is less phosphatic than the phosphate matrix. Both layers contain materials in which there occur minor element values, and uranium values ranging from about 0.007% to about 0.3%.

Apparently uranium occurs in different forms in the different layers. The leached zone layer contains predominantly acid insoluble quartz which it has been found advantageous to remove, but not necessary to the invention, before acid solubilizing. The uranium values occur, when a split is effected in leached zone material, predominantly in the small particle fraction of a size smaller than about 150 mesh to about 220 mesh. This small particle fraction is the more valuable fraction of the leached zone material for the purpose of the instant invention and contains roughly 70% of the valuable minerals to be found in the leached zone material.

On the other hand, it has been found advantageous to separate the phosphate matrix after clay and slime removal into two fractions; a coarse fraction of approximately +200 mesh and a fine fraction of approximately −200 mesh, inasmuch as in this material approximately 80% of the valuable minerals and uranium occur in the +200 mesh fraction.

Once a source material has been prepared and the respective solutions obtained, the method of recovering the uranium and other mineral values therefrom is the same as regards the major processing steps.

In the process discussed herein, relative to processing phosphates as a representative ore, a slurry from the ore dressing operation of leached zone material is thickened to about 20% to about 40% solids density. This slurry is reacted or digested with an acid such as sulfuric acid under such conditions of time, temperature, pressure, concentration of acid and total amount of acid as to obtain optimum recovery of uranium, phosphatic and aluminum values; i. e., through the formation of compounds soluble in aqueous media. Under some circumstances, depending primarily upon the solids composition, it is preferable that the solids be reacted with sulfuric acid in combination with an oxidizing agent such as nitric acid. The solubilizing agent, it will be recognized, may be other than sulfuric acid.

Minerals and phosphates to be found in the ore either with or without any sizing treatment are converted into water soluble products by reaction with sulfuric acid under conditions which give either a slurry product or a dry product. The slurry products may be formed as a result of the so-called wet process method or the pressure method.

In the wet process method, the reaction is carried out at a temperature generally between about 60° C. and about 90° C. and preferably at about 75° C. Digestion is carried out in a slurry condition for a period of about 10 minutes to about 360 minutes and preferably under conditions for maximum recovery of mineral values during a reaction period of about 15 minutes to about 60 minutes. Generally, shortening of the reaction time is accomplished by increasing the degree of acidulation. Concentration of acid contained in the slurry mixture should be between about 20% and about 50% sulfuric acid, preferably about 30%. The acid may be added as 98% sulfuric acid, or as dilute acid of a strength such that upon addition to the aqueous slurry the desired final acid concentration in the mixture is attained. Depending upon the character of the particular material being processed, between about 20% and about 105% acidulation is desired. Normally this corresponds to the addition of between about 29 pounds and about 120 pounds of sulfuric acid per 100 pounds of sized ore.

The percent acidulation referred to in this description is calculated on the basis of the reaction of sulfuric acid with all of the iron, aluminum, calcium, magnesium and sodium or other significant cationic constituents present.

In the pressure autoclave method of treating slurry, which is usually utilized in the treatment of leached zone material, 20% to 65% solids content slurry of about +200 mesh is heated under either extraneously produced or autogenous pressure. Pressures ranging between about 10 pounds per square inch and about 175 pounds per square inch or above are usable, but it is preferred to maintain pressures of about 160 pound gauge. Temperatures maintained in the reaction mass are normally between about 75° C. and about 200° C. The concentration of the sulfuric acid in the slurried mixture is about the same for either the wet process or pressure method.

The time of digestion in the autoclave process is much shorter than for the wet process and requires between about 1 minute and about 60 minutes, preferably between about 30 minutes and about 45 minutes. For maximum recovery of uranium and aluminum values, the percent acidulation ranges between about 20% and about 90% with about 80% acidulation preferred. At 80% acidulation between about 85% and about 93% of the $U_3O_8$ and between about 80% to about 93% of the alumina and between about 85% and about 95% of the phosphate content is solubilized.

In the aging method, the mixture of ore and acid is balanced to produce after thorough agitation a soupy mass. The mixing time is usually 2 to 5 minutes. The soupy mixture resulting from the acid addition is delivered to a curing pile where it sets to a dry mass while it remains for between about 15 days and about 60 days, preferably about 45 days although the exact time is not critical. In general, the longer the curing period, the higher the ultimate recovery of the desired constituents will be.

The concentration of acid employed is usually the highest possible concentration compatible with the type of equipment used and with the ability to mechanically agitate the soupy mass during the acid addition step. The sulfuric acid is usually added as 40% to 65% aqueous sulfuric acid. The greater the percent of acidulation, the greater the ultimate recovery of desired constituents will be. Acidulation will vary from about 25% to about 85% and preferably will be about 65%.

The digested material when mixed with water or aqueous medium forms a slurry. The extract produced from various sources of raw materials after removal of the insoluble constituents will vary, depending upon the degree of acidulation, from an acid solution either predominantly sulfuric acid or substantially phosphoric acid to a solution that is predominantly monocalcium phosphate. The taking up in the aqueous medium of the soluble constituents is generally done in a step-wise multistage (usually three or four) countercurrent leaching operation.

The extract of dissolved material containing the uranium, phosphorous and aluminum values or other values may be treated to recover uranium solely either from slurry or solids free extract, but is preferably step-wise treated for separate recovery of each of these values.

Generally, in treating the extract from leached zone materials as a representative solution the aluminum is separated first. To accomplish this the filtrate from the solids-liquid separation preferably is treated with a sulfate of ammonia, i. e., ammonium sulfate or ammonium acid sulfate. The filtrate is preferably adjusted to a specific gravity between about 1.25 and about 1.5 before sulfate addition, generally to about 1.3. Maximum yield of ammonium alum crystals is obtained by proper correlation of time and temperature and ratio of $Al_2O_3$ to $SO_4$. Crystallizing time may be as long as 24 hours but for economic commercial operation between about 2 hours to about 4 hours is satisfactory.

Solution of ammonium sulfate is usually carried out at about 70° C. to crystallize out the alum, the mixture is generally cooled to between about +25° C. and about −10° C. with about +5° C. being normally used. For optimum aluminum recovery, it has been found that the quantity of sulfate should approach an $Al_2O_3$ to $SO_4$ mol ratio of about 1 to 4, or at least the sulfate should be in excess of that required to combine with the $Al_2O_3$ to give aluminum sulfate. This adjustment of $SO_4$ ratio is an item of consideration in determining the degree of acidulation with sulfuric acid. If acidulation is carried to 100%, the $Al_2O_3$ to $SO_4$ mol ratio in the solution from the leaching operation would be about 1 to 3. Lower acidulation with its consequently lower ratio, say $Al_2O_3$ to $SO_4$ mol ratio 1 to 2 from 60% acidulation, gives lower alum recovery. This can be compensated by addition of sulfuric acid and/or sulfates of ammonia just prior to ammonium alum crystallization. In commercial operations it is important that the ammonium content is not appreciably higher than necessary to give ammonium sulfate since with rise in alkalinity, the alum recovery will decrease for any given set of crystallizing conditions. Ammonium sulfate is normally added such that the $(NH_4)_2SO_4$ to $Al_2O_3$ mol ratio falls between about 1 to 1 and about 4 to 1 and preferably at about 1.8 to 1.

In order to assure alum crystals of as high purity as possible, the liquor for alum crystallization is cooled from about 65° C. or about 70° C. to about 35° C, at a very slow rate, for example, over a period of about 4 hours to about 12 hours. Continuous crystallization such as the Oslo-Krystal system or batch crystallizations may be used, the latter being chosen if crystal purity is of utmost importance.

To prepare alum crystals sufficiently low in $P_2O_5$, $Fe_2O_3$ and other undesirable constituents, the crystallization is preferably carried out in two stages, thereby obtaining crystals which can be further reacted to form relatively pure aluminum hydrate, $Al_2O_3 \times H_2O$, the further processing of which forms no part of the instant invention. Any number of crystallizations may be utilized to obtain a higher purity alum crystal, and it is not intended to limit the operation described to any specific number of crystallizations.

The liquor from the first alum crystallization-separation operation is the feed material from which the uranium, iron, phosphorus, etc. values are ultimately recovered.

Uranium is recovered from the liquor next by use of the liquid-liquid solvent extraction methods. Preferably the liquor is conditioned for solvent extraction by a reduction reaction either by electrolytic means or by chemical reaction such as by treatment with metallic iron, aluminum and the like, although such action is not necessary to successful extraction. Without reduction, a larger number of extraction stages are required to get the same percentage recovery.

The uranium recovery operation consists, for example, of agitating the liquor-metallic iron slurry for several minutes. The iron content of the slurry may be varied from about 0.1 gram to about 16 grams per gallon of liquor, preferably about 6 grams. The slurry is next subjected to liquid-solids separation to remove unreacted metal. This may be accomplished through the use of a filter, centrifuge, cyclone or other suitable separation device.

Reduced liquid is then brought into intimate contact with an organic solvent having selectivity for uranium values. This organic solvent is made up of two components, the extractant and the vehicle or extender. The extractant may be one or more of the ortho and/or pyrophosphoric acid esters of alkyl monohydric alcohols, usually esters of alcohols of 6 to 10 carbon atoms. Both the mono and the di-esters, as well as mixtures of the two, are useful. The hexyl, isoheptyl, n-octyl, iso-octyl, nonyl, iso-nonyl esters are satisfactory, but the preferred species are the mono and/or the di-esters of either octyl or hexyl alcohol with the phosphoric acids since they are less water soluble.

The extender or vehicle may be any one or more of the common organic solvents such as kerosene, benzene, mineral spirits, carbon tetrachloride, toluene, xylene, and the like, Extenders are limited only in that they must be miscible or partially miscible with the extractant used, and substantially immiscible with the aqueous solution or liquor. Since the esters or extractants have a limited solubility in water, the aqueous medium before recycling to the system is normally scrubbed with a solvent such as kerosene or trichlorethylene to reduce the ester content which would be lost in subsequent processing.

The concentration of the extractant in the vehicle may vary widely, for example, between about 0.2% and about 50%, preferably between about 1% and about 10%. The volume ratios of aqueous solution to solvent may also vary within wide limits, for example, between about 1 to 1 and about 40 to 1, and preferably between about 5 to 1 and about 20 to 1, provided the ammonium ion concentration does not exceed about 5% by solution weight. If this quantity ammonium ion is present, extraction is less effective for any fixed amount of solvent or number of stages. If the ammonium ion concentration is too high, the extraction may be maintained at a high level by adjustments, for example, by decreasing the ratio of aqueous solution to organic solvent or by adjustment of the $NH_3$ to $SO_4$ ratio. It is preferred to contact the organic solvent with the liquor or solution temperatures between about room temperature and about 60° C., preferably about 20° C.

After agitation of the two materials to effect intimate contact, the time varying with efficiency of agitation, the materials are allowed to separate whereby two distinct phases are formed; namely, an aqueous phase and the organic phase rich in uranium values. Continuous extraction is usually carried out in commercial operation in a multistage counter-current extractor.

The organic phase is next stripped of its uranium content and the organic solvent returned to the extraction system. The method of stripping as heretofore described has had the serious disadvantage that the extraction power of the organic solvent was quickly dissipated and emulsion difficulties were encountered. This loss of extractability for uranium caused the organic phase to be discarded after about 3 to 7 passes through the extraction system.

In the new method of recovering solids from the organic phase separated in the extraction system, the organic phase is treated with an aqueous mixture consisting predominantly of sulfuric acid and hydrofluoric acid. This combination or the combination plus a small amount of phosphoric acid which may be added or which may be accumulated in the aqueous mixture as a carry-through material from the extraction step has characteristics making it superior to other known materials for precipitation of uranium as a fluoride. This precipitated material, together with the aqueous phase, is separated from the lean organic phase. The precipitated material is recovered by filtering or centrifuging and then washed and dried.

To effect this precipitation, the rich organic phase is intimately mixed with aqueous solution of acids, either batchwise with agitation or in a continuous washing system running counter-currently. The ratio of organic solvent to aqueous acid solution may be varied from about 1 to 1 to about 20 to 1 or higher on a volume basis.

Aqueous precipitation solutions containing about 5% to about 60% sulfuric acid are most desirable for this operation with best results obtained with a sulfuric acid content of about 10% to about 30%. At these concentrations of sulfuric acid, results are superior to those obtained with predominantly phosphoric acid solutions because of more rapid phase separation after mixing which results in a shorter organic phase-aqueous contact time and a consequent lessening in degradation of the organic extractant agent. The hydrofluoric acid content of the aqueous solution will vary depending somewhat upon the $U_3O_8$ content of the rich organic solvent. In general, the hydrofluoric acid content will vary from about 10% to about 30% with about 15% to about 25% hydrofluoric acid on a weight basis preferred for commercial operations. For maximum precipitation between about 50% to about 100% excess of hydrofluoric acid over that required to produce uranium fluoride is preferred. Lower excesses may be used, but this results in an incomplete precipitation of uranium thereby requiring a greater cyclic organic load in the recirculation system employed. When the organic solvent solution is high in uranium content, hydrofluoric acid in excess of the above specified quantities may be required.

The lean or stripped aqueous phase acid solution after adjustment of its hydrofluoric acid content is recycled to mixing with uranium-rich organic solvent phase. The lean organic phase (either with or without treatment to strip it of its hydrofluoric acid content) is reused for subsequent uranium extraction of the uranium containing solution. Hydrofluoric acid may be stripped from the organic solvent phase by scrubbing with about 5% to about 10% sulfuric acid.

Uranium fluoride precipitate may be treated to recover the hydrofluoric acid for reuse. In this operation, the precipitate is mixed with dilute sulfuric acid of about 3% to about 10% concentration in about a 1 to 5 volume ratio of solids to acid, heated to volatilize the hydrofluoric acid for absorption and reuse the partially evaporated solution cooled to crystallize uranyl sulfate, after which the crystals are separated from the mother liquor, washed and dried.

In the figure the results are shown for contact of uranium-rich organic solvents with aqueous acid mixtures having four different acid compositions. Each composition was prepared by mixing on a percent-by-weight basis, the acids as indicated in the following table.

|  | $H_2O$ | HCl | $H_2SO_4$ | $H_3PO_4$ | HF |
|---|---|---|---|---|---|
|  | Percent | Percent | Percent | Percent | Percent |
| Composition A | 60 | | | 25 | 15 |
| Composition B | 60 | | 25 | | 15 |
| Composition C | 60 | | 24 | 1 | 15 |
| Composition D | 60 | 24 | | 1 | 15 |

In the operation of the process as applied to monocalcium phosphate, reduced extract was centrifuged to remove any unreacted iron. The reduced extract was next intimately mixed for 5 minutes in an extract to organic solvent volume ratio of 10 to 1. Upon separation of the aqueous phase for further processing, the organic phase is treated with sulfuric acid to precipitate the extracted calcium. This precipitation step is unnecessary when treating extract obtained in the processing of leached zone material or phosphoric acid. After separation of the precipitated calcium sulfate, the rich organic solvent was intimately mixed with Composition A in a volume ratio of about 5 to 1. After settling, the aqueous Composition A phase plus uranium fluoride precipitate was separated and the lean organic solvent phase recycled to contact with fresh reduced extract. This recycling was repeated through 10 cycles and in each instance the rich calcium stripped organic solvent phase was contacted with fresh aqueous solution having Composition A explained above to remove the extracted uranium. Analysis of the lean extract after each contact of reduced rich extract with original or recycled organic solvent permits calculation of the percent extraction (by difference in $U_3O_8$ content).

The same identical procedure was followed when utilizing Compositions B, C and D as precipitating agent.

The curves presented in the figure summarize the results and are plots of percent extraction based upon analyses on a $U_3O_8$ basis versus the number of cycles; i. e., the number of times that the organic solvent has been repassed to contact with rich extract. Study of the curves shows that organic solvent treated with compositions containing hydrochloric acid quickly lose their power to extract uranium. Organic solvent treated with compositions predominated by the presence of phosphoric acid fall off in their extracting power rapidly to about 30% extractive power following which the loss of extractive is gradual. At all stages of comparison organic solvent treated with sulphuric acid compositions shows a maintenance of markedly superior extractive power. Further grounds for superiority of sulfuric acid over predominantly phosphoric acid composition lies in the markedly higher uranium analysis of uranium fluorides cakes produced.

In commercial operation, extract is subjected to 4 or 5 counter-current stages of extraction with the organic solvent. This organic solvent, after precipitation of the calcium by means of a reaction by dilute sulfuric acid, is then intimately mixed with the precipitant. This precipitation is sufficiently quantitative so that only one stage of precipitation is generally needed to strip uranium content from the organic solvent and thus condition the solvent for recycling to the extraction system.

Having thus fully described the character of my invention, what is desired to be secured and claimed by Letters Patent is:

1. In a process of recovering uranium values from aqueous solution containing tetravalent uranium values by liquid-liquid extraction with an alkyl acid ester of a phosphoric acid selected from the group consisting of orthophosphoric acid and pyrophosphoric acid organic solvent, the steps which comprise treating the organic solvent with an aqueous mixture comprising predominantly sulfuric acid having a concentration between about 5% and about 60% by weight and hydrofluoric acid to precipitate the tetravalent uranium, separating the aqueous acid phase and precipitate from the organic solvent phase, returning the organic phase to the extraction system and separately recovering the uranium precipitate and the aqueous acid mixture.

2. In a process of recovering uranium values from aqueous solution containing tetravalent uranium values by liquid-liquid extraction with an alkyl acid ester of a phosphoric acid selected from the group consisting of orthophosphoric acid and pyrophosphoric acid organic solvent, the steps which comprise treating the organic solvent with an aqueous mixture comprising predominantly sulfuric acid having a concentration between about 5% and about 60% by weight and hydrofluoric acid to precipitate the tetravalent uranium, separating the aqueous acid phase and precipitate from the organic solvent phase, returning the organic phase to the extraction system, introducing hydrofluoric acid into the aqueous acid mixture to replace the hydrofluoric acid lost during processing, and recycling the restored acid mixture to the uranium precipitation step.

3. In a process of recovering uranium values from aqueous solution containing tetravalent uranium values by liquid-liquid extraction with an alkyl acid ester of a phosphoric acid selected from the group consisting of orthophosphoric acid and pyrophosphoric acid organic solvent, the steps which comprise treating the organic solvent with an aqueous mixture comprising predominantly sulfuric acid having a concentration between about 5% and about 60% by weight and hydrofluoric acid in a ratio range of solvent to aqueous acid solution between about 1 to 1 and about 40 to 1 to precipitate the tetravalent uranium, separating the aqueous acid phase and precipitate from the organic solvent phase, returning the organic phase to the extraction system and separately recovering the uranium precipitate and the aqueous acid mixture.

4. In a process of recovering uranium values from aqueous solution containing tetravalent uranium values by liquid-liquid extraction with an alkyl acid ester of a phosphoric acid selected from the group consisting of orthophosphoric acid and pyrophosphoric acid organic solvent, the steps which comprise treating the organic solvent with an aqueous mixture comprising predominantly sulfuric acid having a concentration between about 5% and about 60% by weight and hydrofluoric acid having a concentration of between about 10% and about 30% by weight in a ratio range of solvent to aqueous acid solution between about 1.5 to 1 and about 6 to 1 to precipitate the tetravalent uranium, separating the aqueous acid phase and precipitate from the organic solvent phase, returning the organic phase to the extraction system and separately recovering the uranium precipitate and the aqueous acid mixture.

5. In a process of recovering uranium values from aqueous solution containing tetravalent uranium values by liquid-liquid extraction with an alkyl acid ester of a phosphoric acid selected from the group consisting of orthophosphoric acid and pyrophosphoric acid organic solvent, the steps which comprise treating the organic solvent with an aqueous mixture comprising predominantly sulfuric acid and hydrofluoric acid in the ratio range of solvent to aqueous acid solution between about 1 to 1 and about 40 to 1 to precipitate the tetravalent uranium, the percentage of sulfuric acid present being between about 15% and about 45% by weight and the percentage of hydrofluoric acid present being between about 10% and about 30% by weight to precipitate the uranium, separating the aqueous acid phase and precipitate from the organic solvent phase, returning the organic phase to the extraction system and separately recovering the uranium precipitate and the aqueous acid mixture.

6. In a process of recovering uranium values from aqueous solution containing tetravalent uranium values by liquid-liquid extraction with an alkyl acid ester of a phosphoric acid selected from the group consisting of orthophosphoric acid and pyrophosphoric acid organic solvent, the steps comprising treating the organic solvent with an aqueous mixture comprising predominantly sulfuric acid and hydrofluoric acid in the ratio range of solvent to aqueous acid solution between about 1 to 1 and about 40 to 1 to precipitate the tetravalent uranium, the percentage of sulfuric acid present being between about 10% to about 30% by weight and the percentage of hydrofluoric acid present being between about 10% to about 30% by weight to precipitate the uranium, separating the aqueous acid phase and precipitate from the organic solvent phase, returning the organic phase to the extraction system and separately recovering the uranium precipitate and the aqueous acid mixture.

7. In a process of recovering uranium values from aqueous solution containing tetravalent uranium values by liquid-liquid extraction with an alkyl acid ester of a phosphoric acid selected from the group consisting of orthophosphoric acid and pyrophosphoric acid organic solvent, the steps comprising contacting the phosphate solution with organic solvent comprising extender and extractant selected from the group consisting of ortho and pyrophosphoric acid esters of alkyl monohydric alcohols and mixtures thereof, separating the uranium-rich organic solvent from the contacted aqueous phosphate solution, the steps which comprise treating the rich organic solvent with an aqueous mixture comprising predominantly surfuric acid having a concentration between about 5% and about 60% by weight and hydrofluoric acid having a concentration of between about 10% and about 30% by weight to precipitate the tetravalent uranium, separating the aqueous acid phase and precipitate from the organic solvent phase, returning the organic phase to the extraction system, and separately recovering the uranium precipitate and the aqueous acid mixture.

8. In a process of recovering uranium values from aqueous solution containing tetravalent uranium values by liquid-liquid extraction with an alkyl acid ester of a phosphoric acid selected from the group consisting of orthophosphoric acid and pyrophosphoric acid organic solvent, the steps comprising contacting the phosphate solution with organic solvents comprising extender and extractant selected from the group consisting of ortho and pyrophosphoric acid esters of alkylmonohydric alcohol of between about 6 to about 10 carbon atoms, separating the uranium-rich organic solvent from the contacted aqueous phosphate solution, the steps which comprise treating the rich organic solvent with an aqueous mixture comprising predominantly sulfuric acid having a concentration between about 5% and about 60% by weight and hydrofluoric acid having a concentration of between about 10% and about 30% by weight to precipitate the tetravalent uranium, separating the aqueous acid phase and precipitate from the organic solvent phase, returning the organic phase to the extraction system and separately recovering the uranium precipitate and the aqueous acid mixture.

9. The process according to claim 8 in which the phosphoric acid ester is the ester of octyl alcohol.

10. The process according to claim 8 in which the phosphoric acid ester is the ester of nonyl alcohol.

11. In a process of recovering uranium values from aqueous calcium phosphate solution by liquid-liquid extraction with an alkyl acid ester of a phosphoric acid selected from the group consisting of orthophosphoric acid and pyrophosphoric acid organic solvent, the steps comprising subjecting the phosphate solution to a reduction reaction to convert uranium to the tetravalent state, contacting the reduced phosphate solution with a phosphoric acid ester organic solvent, separating the uranium-rich organic solvent from the contacted aqueous phosphate solution, treating the rich organic solvent with dilute sulfuric acid in quantity sufficient to precipitate calcium as calcium sulfate, removing the precipitated material, mixing with the uranium-rich organic phase an aqueous acid mixture comprising predominantly sulfuric acid and hydrofluoric acid to precipitate the tetravalent uranium, separating the aqueous acid phase from the organic phase, returning the organic phase to the extraction system and separately recovering the uranium precipitate and the aqueous acid mixture.

12. In a process of recovering aluminum and uranium values from aqueous phosphate solutions containing the same, the steps comprising reacting the solution with a sulfate of ammonia, removing the ammonium alum crystals formed, subjecting the resultant solution to a reduction reaction to convert uranium to the tetravalent state, contacting the reacted solution with an acidic phosphoric acid ester organic solvent having an affinity for uranium values, separating the uranium-rich organic solvent from the contacted aqueous phosphate solution, treating the rich organic solvent with an aqueous mixture of sulfuric acid having a concentration between about 5% and about 60% by weight and hydrofluoric acid having a concentration of between about 10% and about 30% by weight to precipitate the teravalent uranium, separating the aqueous acid phase from the organic phase, returning the organic phase to the extraction system, and separately recovering the uranium precipitate and aqueous acid mixture.

13. The process of recovering uranium values from Florida phosphate rock which comprises grinding the rock to a particle size approximately 62% of which passes a 200 mesh standard screen, mixing the rock with solubilizing acid, aging the acid rock for about 30 days, leaching the aged acid rock mix with sufficient aqueous medium to give a slurry of about 35% undissolved solids, counter-currently removing the soluble constituents from the slurry with water to obtain a solution containing about 30% dissolved solids, treating the solution with approximately one pound of metallic iron per 20 gallons of solution, contacting the reduced solution with approximately one gallon of organic solvent per ten gallons of reduced solution, said organic solvent being composed of about 9 parts by volume of kerosene and about one part by volume of a mixture of mono- and di-esters of ortho and pyrophosphoric acids of octyl alcohol, treating the organic solvents rich in uranium with about one gallon of acid mixture per three gallons of organic solvent, the acid mixture having a composition by weight consisting of about 60% water, about 25% sulfuric acid, and about 15% hydrofluoric acid, separating the aqueous acid phase from the organic phase, returning the organic phase to the extraction system and filtering the uranium precipitate from the aqueous acid mixture.

14. In a process of recovering uranium values from aqueous calcium phosphate solution by liquid-liquid extraction with a phosphoric acid ester organic solvent, the steps comprising subjecting the phosphate solution to a reduction reaction, contacting the reduced phosphate solution with an acidic phosphoric acid ester organic solvent, separating the uranium-rich organic solvent from the contacted aqueous phosphate solution, treating the rich organic solvent with dilute sulfuric acid in quantity sufficient to precipitate calcium as calcium sulfate, removing the precipitated material, mixing with the uranium-rich organic phase an aqueous acid mixture comprising about 60% water, about 24% sulfuric acid, about 1% phosphoric acid, and about 15% hydrofluoric acid by weight to precipitate the tetravalent uranium, separating the aqueous acid phase from the organic phase, returning the organic phase to the extraction system and separately recovering the uranium precipitate and the aqueous acid mixture.

References Cited in the file of this patent

UNITED STATES PATENTS

| | | |
|---|---|---|
| 1,154,230 | Bredt | Sept. 21, 1915 |
| 2,227,833 | Hixson et al. | Jan. 1, 1941 |
| 2,767,045 | McCullough | Oct. 16, 1956 |
| 2,769,686 | McCullough et al. | Nov. 6, 1956 |

OTHER REFERENCES

Friend: Textbook of Inorganic Chem., vol. 7, part 3, pp. 291–3 (1926).

Warf: U. S. Atomic Energy Comm., declassified paper AECD 2524, Aug. 7, 1947, declassified Mar. 11, 1949, 10 pages.

Wright: U. S. Atomic Energy Comm. declassified document No. Y–884, 20 pages, May 7, 1952.